No. 770,863. PATENTED SEPT. 27, 1904.
J. KOENIG.
BIGGIN.
APPLICATION FILED DEC. 7, 1903.
NO MODEL.
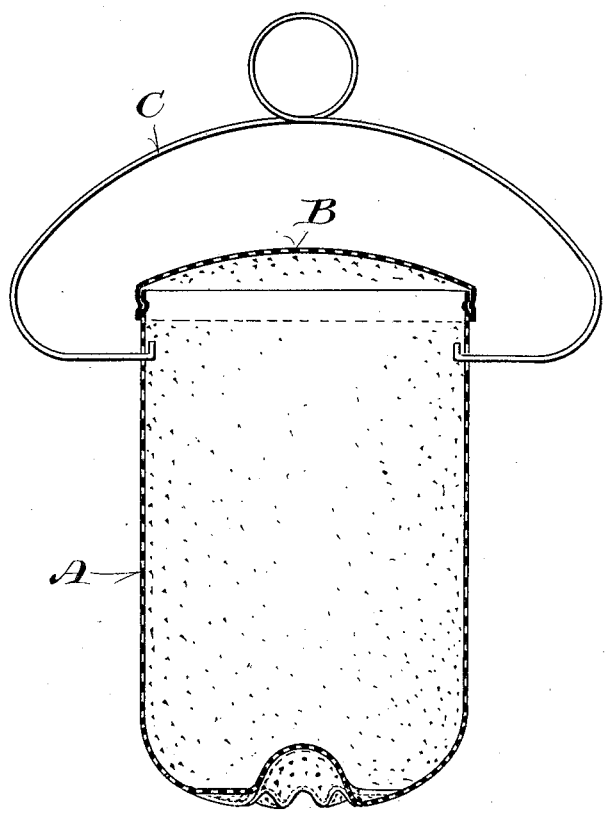

No. 770,863. Patented September 27, 1904.

UNITED STATES PATENT OFFICE.

JOSEPH KOENIG, OF TWO RIVERS, WISCONSIN, ASSIGNOR TO ALUMINUM MANUFACTURING COMPANY, OF TWO RIVERS, WISCONSIN.

BIGGIN.

SPECIFICATION forming part of Letters Patent No. 770,863, dated September 27, 1904.

Application filed December 7, 1903. Serial No. 184,006. (No model.)

*To all whom it may concern:*

Be it known that I, JOSEPH KOENIG, a citizen of the United States, and a resident of Two Rivers, in the county of Manitowoc and State of Wisconsin, have invented certain new and useful Improvements in Biggins; and I do hereby declare that the following is a full, clear, and exact description thereof.

My invention has for its object to provide simple, economical, and durable biggins, the same consisting in what is hereinafter particularly set forth, with reference to the accompanying drawing, and subsequently claimed.

The drawing represents a vertical sectional view of a biggin in accordance with my invention.

Referring by letter to the drawing, A indicates a one-piece seamless cylindrical cup having a concavo-convex bottom, convex side outward, said bottom being centrally dented in an upward direction and radially corrugated. The cup is made from suitable metal drawn into shape, the denting and corrugating of its bottom being done subsequently to the drawing operation. The wall and bottom of the cup are perforated, and a removable perforated metal cap B has tight fit on said cup. Extending through diametrically-opposite apertures in the wall of the cup are the loose ends of a spring-wire bail C, that extends laterally in opposite directions from said cup, and said bail is preferably bent to form a central upper loop. The inner extremities of the bail are bent at right angles to the adjacent horizontal portions of the same to serve as stops to prevent disconnection of said bail from the cup, and this bail, being contracted in a coffee-pot, serves to hold the covered cup in any position to which it may be vertically adjusted in said pot. The covered cup and contents being immersed in a coffee-pot, boiling water has circulation in said cup through the perforations of the same and cover, and the cup-bottom is dented and corrugated to improve the circulation.

Having thus described my invention, what I claim as new, and desire to secure by Letters Patent, is—

1. A biggin comprising a perforated cup having the bottom thereof centrally dented in an upward direction and radially corrugated.

2. A biggin comprising a one-piece perforated cup having the bottom thereof centrally dented in an upward direction and radially corrugated, a perforated cover for the cup, and a contractile bail in connection with said cup.

In testimony that I claim the foregoing I have hereunto set my hand, at Two Rivers, in the county of Manitowoc and State of Wisconsin, in the presence of two witnesses.

JOSEPH KOENIG.

Witnesses:
W. J. WRIETH,
ERWIN W. BAERWALDT.